United States Patent Office 2,992,221
Patented July 11, 1961

2,992,221
POLYMETHYLENE-OXOQUINAZOLINES AND THEIR PRODUCTION

Siegfried Petersen and Ernst Tietze, both of Farbenfabriken Bayer AG, Leverkusen-Bayerwerk, Germany
No Drawing. Filed June 29, 1959, Ser. No. 823,309
Claims priority, application Germany July 3, 1958
9 Claims. (Cl. 260—251)

The present invention relates to novel polynuclear heterocyclic compounds having at least two nitrogen atoms and more particularly to certain new polyalkylene oxoquinazolines and derivatives and analogs thereof and their production by reacting cyclic o-aminocarboxylic acids having an unsubstituted amino group, or their N-carboxylic acid anhydrides, with cyclic lactim ethers, thioethers and esters.

The new compounds are usually colorless and well crystallized, are weakly basic and form salts with mineral acids. Some of the new compounds fluoresce in ultraviolet light. They are useful as such for hypnotics, as starting materials for numerous additional syntheses, and as intermediates for the production of pharmaceuticals, agricultural chemicals and dyes.

The production of the new compounds is illustrated by the reaction, which is believed to take place in two stages, of anthranilic acid and caprolactim methyl ether (made for example, by the methylation of caprolactam with dimethyl sulfate) wherein the methoxy group of the lactim ether is replaced by the amino group of the o-amino-benzoic acid and the resultant cyclic amidine in its tautomeric form gives up 1 mol of water to form 2,3-pentamethylene-4-oxoquinazoline dihydride according to the reaction scheme:

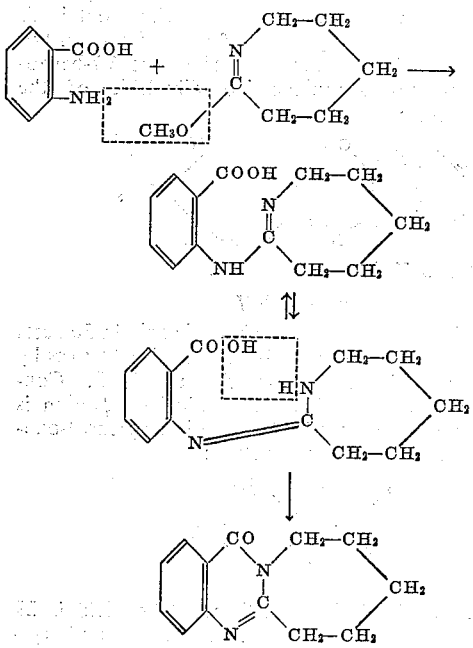

The reaction proceeds readily with little or no heating by bringing the reactants into contact in a suitable solvent such as methanol, ethanol, higher alcohols, acetone, glycol monoalkyl ethers, glycol monomethyl ether acetate, ethyl acetate, tetrahydrofuran, aromatic hydrocarbons or water. The reaction can also be carried out in the absence of a solvent by simple fusion of the reactants. The uncyclized intermediates can be isolated in only a few special cases. Where ring closure is difficult for steric reasons, it can be accomplished by heating, for example in glacial acetic acid. The process can be widely varied to utilize the numerous available cyclic lactim ethers and cyclic o-amino acids as reactants.

Lactim ethers usable in the invention include butyrolactim ether, valerolactim ether, caprolactim ether, alkylcaprolactim ethers, capryllactim ether and lactim ethers with 10 to 20 carbon atoms in the ring. Polynuclear lactim ethers are also suitable for use in the invention such as γ,γ-pentamethylene butyrolactim methyl ether:

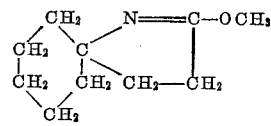

While it is preferred to employ the readily available cyclic lactim methyl and ethyl ether, lactim ethers of higher alcohols and lactim thioethers are likewise suitable for use. The cyclic lactim esters such as those obtained by rearrangement of, for instance, cyclohexanone oxime p-toluenesulfonic acid esters can also be used.

Many cyclic o-amino acids with an unsubstituted amino group are available and may be used for the reaction. These include cycloaliphatic amino acids such as 2-aminocyclopentanoic acid and 2-aminocyclohexanoic acid; numerous aromatic 2-primary-aminocarboxylic acids of which the simplest is anthranilic acid and derivatives thereof wherein the aromatic nucleus is substituted by one or more of the following: alkyl groups, halogen atoms, nitro, sulfonic acid, sulfonamide, carboxylic acid and carboxamide groups. Useful also are aminocarboxylic acids of higher ring systems such as 2-naphthylamine-1-carboxylic acid, 2-naphthylamine - 3 - carboxylic acid and 4,4'-diaminodiphenyl - 3,3'-dicarboxylic acid which is twice reactable with cyclic lactim ethers. Included also are heterocyclic compounds having a primary amino group ortho to a carboxyl group. In lieu of the aromatic o-aminocarboxylic acids, their reaction products with phosgene can be used for reaction with cyclic lactim ethers, i.e., isatoic anhydride instead of, for example, 2-aminobenzoic acid. Since this modification is somewhat more circuitous, it is not preferred.

The invention is illustrated by the following nonlimitative examples:

Example I 280 parts by weight of caprolactim methyl ether is instilled, while stirring, into a suspension of 274 parts of 2-aminobenzoic acid in 200 parts by weight of acetone within a period of 2 hours. The caprolactim ether feed is carried out with cooling at such rate that the temperature does not rise above 10° C. The 2-aminobenzoic acid dissolves rapidly and after 2 hours there is a profuse precipitation of a preliminary product which dissolves again within 2 hours when cautiously heated to 30° C. The reaction is brought to completion by allowing the temperature to rise gradually to 40–60° C. in 4 hours. Cooling in ice water gives a thick paste of colorless crystals which is filtered off by suction and washed with a mixture of aceton and ether and finally with ether alone, giving 265 parts by weight (62% of theory) of 2,3-pentamethylene-4-oxoquinazoline dihydride of the formula:

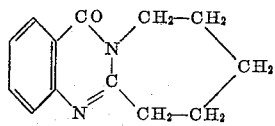

The crude product melts at 95–97° C. A sample crystallized from glycol monomethyl ether acetate shows the same melting point. The compound is insoluble in dilute caustic soda solution but forms a water-soluble, well-crystallizing hydrochloride M. Pt. 220–222° C. with 1 mol HCl in aqueous solution. The borofluoride is sparingly water-soluble and melts at 204–205° C. The nitrate decomposes at 170° C.

Example II 132 parts (1 mol) of 2-aminobenzoic acid is mixed with 140 parts (1 mol) of caprolactim methyl ether. The mixture heats up in a short time and melts together. In spite of cooling, the mixture heats up to 85° C. It is then allowed to cool and mixed with an approximately equal volume of acetone. At −20° C. the new compound crystallizes profusely. The resultant 2,3-pentamethylene-4-oxoquinazoline dihydride (same formula as Example I) can be redissolved in a small amount of toluene at 50° C. and is then isolated in pure form at −20° C. It melts at 95–97° C. The yield is about 40–50%.

Example III 82 parts of 4-chloro-2-aminobenzoic acid are doused with 70 parts of caprolactim methyl ether. Reaction sets in shortly and is checked by cooling with ice. A syrup forms which, on addition of acetone and good cooling, precipitates crystals. These are washed with acetone and ether and recrystallized from acetone. The product obtained is 7-chloro-2,3-pentamethylene-4-oxoquinazoline dihydride of the formula:

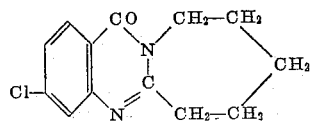

as highly refractive colorless rhombohedra of M. Pt. 113–115° C. The compound is not diazotizable and shows the theoretical chlorine content. Yield: 40–50%.

In analogous fashion 5-chloro-2-aminobenzoic acid gives 6-chloro-2,3-pentamethylene-4-oxoquinazoline dihydride of M. Pt. 107–108° C. of the formula:

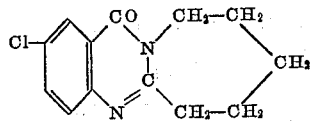

This isomer is more readily soluble in acetone.

Example IV

Into a suspension of 91 parts by weight of 4-nitro-2-aminobenzoic acid in 250 parts by weight of methanol, 70 parts by weight of caprolactim methyl ether is instilled, with cooling below 10° C., within 1 hour. The deep orange-colored pasty reaction material heats up strongly and thins out. When heated for 5 more hours to 60° C. it thickens again and turns a light yellow color. After cooling, 250 parts by weight of water are added. The residue remaining after vacuum-filtration and washing with water is freed from unreacted 4-nitro-2-aminobenzoic acid by stirring with an excess of cold dilute caustic potash solution, filtered again, and washed with water until neutral. The dry crude product is obtained in a yield of 67 parts by weight (72% of theory) and melts at 145–147° C. It crystallizes well from 10 parts of ethanol and subsequently melts at 150–151° C. The compound is 7-nitro-2,3-pentamethylene-4-oxoquinazoline dihydride of the formula:

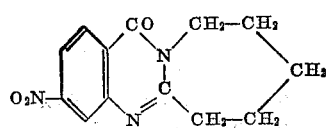

It is soluble in mildly heated dilute hydrochloric acid and reprecipitable from the solution by means of soda solution.

Example V 27.2 parts by weight of benzidine-3,3'-dicarboxylic acid are heated to the boil with stirring in 300 parts by weight of acetone, while 28 parts by weight of caprolactim methyl ether are added dropwise in a period of 15 minutes. A thick white paste is formed which is then boiled under reflux for 4 hours. After cooling, the condensation product is filtered by vacuum and washed with acetone. The yield amounts to 21 parts by weight (50% of theory) of a condensate having the structure:

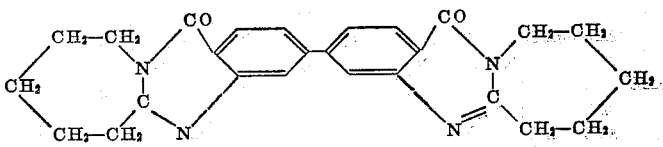

The compound readily crystallizes from 40 parts by weight of glycol monomethyl ether acetate and from an equal amount of dimethylformamide, forming glossy crystals of M. Pt. 298–300° C. The compound is insoluble in dilute soda or caustic soda solution and forms a sparingly soluble hydrochloride that is easily salted out.

Example VI 93.5 parts by weight of 2-naphthylamine-3-carboxylic acid are suspended in 300 cc. of acetone, forming a green slurry. When, at 10° C., 70 parts by weight of caprolactim methyl ether are instilled with stirring, reaction sets in with mild heating. The end of the reaction is followed by refluxing during 6 hours. The green slurry gradually loses its color and thins out, colorless crystals precipitating. The mass is then allowed to cool and filtered by vacuum and the mother liquor is washed with acetone and ether. 110 parts by weight (83% of theory) of an almost pure product of M. Pt. 272–273.5° C. are obtained. The compound can be recrystallized from 6–7 parts of hot glycol monomethyl ether acetate. The pure 6,7-benzo-2,3-pentamethylene-4-oxoquinazoline dihydride of the following formula:

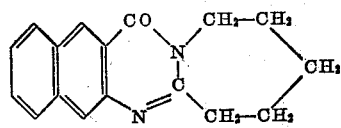

melts at 173–173.5° C.

Example VII 27.4 parts by weight of 2-aminobenzoic acid in 50 parts by weight of acetone are gradually mixed with 22 parts by weight of γ-butyrolactim methyl ether at 10° C. Considerable heat evolves and a clear, colorless solution is formed. On cooling to 0° C., 2,3-trimethylene-4-oxoquinazoline dihydride of the structure:

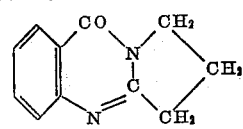

and M. Pt. 110–111° C. crystallizes. The yield is 29 parts by weight (78% of theory). The compound crystallizes well from a small volume of glycol monomethyl ether acetate and also from benzene if an equal amount of petroleum ether is added to the solution. It is very readily water-soluble with a neutral reaction. With 1 mol of hydrochloric acid it forms a crystallizing hydrochloride.

Example VIII

While cooling at 5–10° C., 65 parts by weight of α-valerolactim methyl ether are run into 68.6 parts by weight of 2-aminobenzoic acid in 70 parts by weight of acetone in the course of 20 minutes. When a temporarily precipitated intermediate product has redissolved at 20° C., it is heated to 50° C. for 2 hours. On cooling to −15° C., 2,3-tetramethylene-4-oxoquinazoline dihydride of the formula:

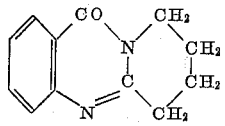

precipitates as a fine crystal powder in a yield of 65% of theory. The crude product, which is hygroscopic, melts between 80 and 85° C. after sintering. The compound is pure when recrystallized from 2 parts of acetone and then melts at 86–87° C. It is sparingly soluble in cold water and readily soluble in warm water. A very readily soluble hydrochloride is obtained with dilute HCl.

Example IX

If in the procedure of Example I the caprolactim methyl ether is replaced by an equivalent quantity of capryllactim methyl ether, a good yield of 2,3-heptamethylene-4-oxoquinazoline dihydride of the formula:

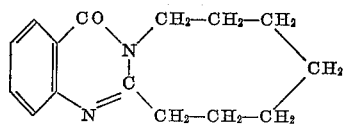

is obtained. Recrystallization from glycol monomethyl ether acetate with some petroleum ether added gives long, colorless needles of M. Pt. 120–121° C. The compound is sparingly soluble in cold water. With dilute hydrochloric acid it forms a well-crystallizing hydrochloride which is very easily soluble in water.

Example X 34.3 parts by weight of 2-aminobenzoic acid are suspended in 100 parts by weight of acetone. While vigorously stirring, 46 parts by weight (theoretically: 41.8 parts by weight) of γ,γ-pentamethylene-butyrolactim methyl ether are instilled at 5° C. The strong heat of reaction is minimized by intermittent cooling, preventing a temperature rise above 10° C. The aminobenzoic acid reacts rapidly, forming a thick white slurry of this sparingly soluble condensate:

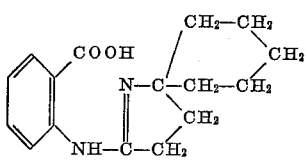

which melts at 205–206° C. with evolution of gas (from dimethyl-formamide). The compound dissolves freely in dilute NaOH and is precipitable from the alkaline solution with acetic acid.

When heated in boiling glacial acetic acid for 1 hour, the compound loses water, giving a quantitative yield of the compound:

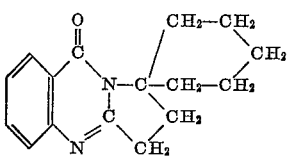

which, on recrystallization from glycol methyl ether acetate, melts at 118–119° C. The compound is insoluble in dilute NaOH. With dilute HCl it forms a water-soluble hydrochloride which can be salted out without difficulty.

Example XI

A mixture of 33 parts of isatoic anhydride and 28 parts of caprolactim methyl ether is heated to 120° C. for 4 hours. This leads to slow evolution of carbon dioxide, and a fluorescent melt is obtained. After cooling, the viscous mass is diluted with an approximately equal volume of acetone. Seeding induces crystallization of the 2,3-pentamethylene-4-oxoquinazoline dihydride described in Example I.

The invention thus comprises a variety of polynuclear heterocyclic compounds containing two or more nitrogen atoms wherein the compounds are substituted or unsubstituted polymethylene oxoquinazolines and derivatives and analogues thereof and which compounds are useful as such for hypnotics or as intermediates for the production or synthesis of pharmaceuticals, agricultural chemicals or dyes.

The invention is defined by the appended claims.

What is claimed is:

1. The compound

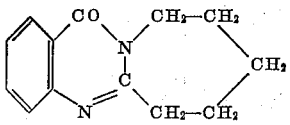

2. The compound

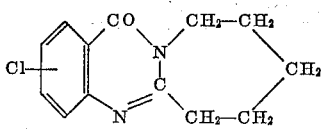

in which Cl is in one of the positions 6 and 7.

3. The compound

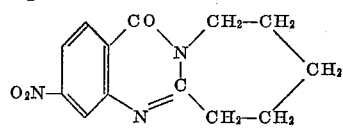

4. The compound

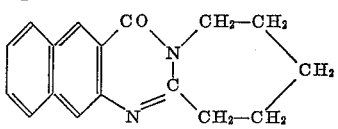

5. The compound

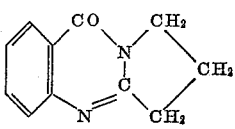

6. The compound

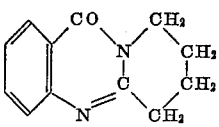

7. The compound

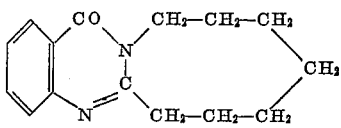

8. The compound

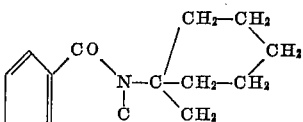

9. A polymethylene 4-oxoquinazoline selected from the group consisting of (I)

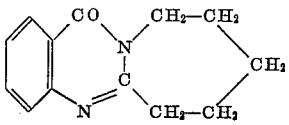

(II) (III) (IV) (V) 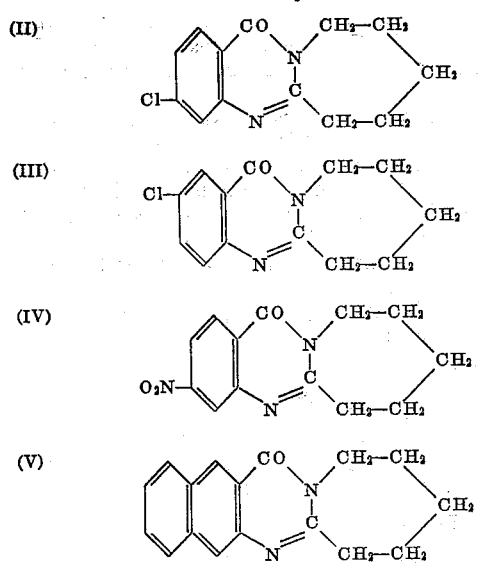
(VI) (VII) (VIII) (IX) 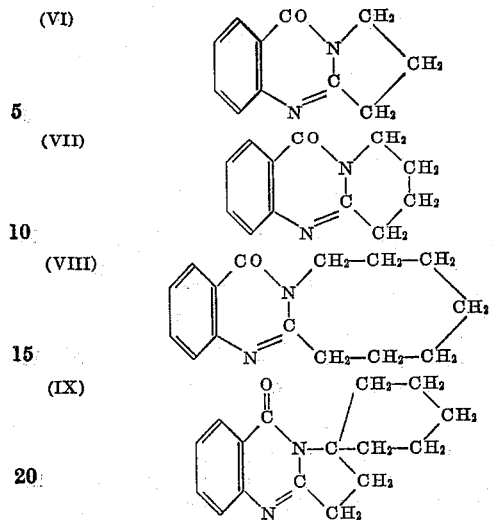
No references cited.